United States Patent [19]
Oswald

[11] 3,820,712
[45] June 28, 1974

[54] ELECTRONIC TACHOMETER
[75] Inventor: Richard Karl Oswald, San Jose, Calif.
[73] Assignee: International Business Machines Corporation, Armonk, N.Y.
[22] Filed: Mar. 12, 1973
[21] Appl. No.: 340,629

[52] U.S. Cl............ 235/151.32, 235/183, 318/618, 324/160
[51] Int. Cl. ......................... G01p 7/00, G06g 7/18
[58] Field of Search ....... 235/151.32, 183; 324/160; 318/610, 611, 618

[56] References Cited
UNITED STATES PATENTS
| | | | |
|---|---|---|---|
| 3,598,981 | 8/1971 | Conger et al. | 235/183 |
| 3,677,094 | 7/1972 | Kupfmuller | 235/183 |
| 3,729,666 | 4/1973 | Kelly | 318/611 |

OTHER PUBLICATIONS
Van Winkle et al.; Phase Sensitive Tachometer Circuit, IBM Tech. Discl. Bull., Vol. 12, No. 12, 1970, p. 2,334.

Primary Examiner—Felix D. Gruber
Attorney, Agent, or Firm—Robert W. Keller; Edward M. Suden

[57] ABSTRACT

An electronic tachometer for generating a continuous velocity output signal from the combination of a discontinuous position signal and a continuous acceleration signal is disclosed. The tachometer comprises a differentiating and timing means for receiving the discontinuous position signal and for developing and generating timing signals and a differentiated discontinuous position signal therefrom, and also signal processing circuitry for receiving and combining the differentiated discontinuous position signal and the timing signals and the continuous acceleration signal to form the continuous velocity output signal. The timing signals change the transfer function of the signal processing circuitry at specific times with relationship to the differentiated discontinuous position signal.

10 Claims, 4 Drawing Figures

ELECTRONIC TACHOMETER

BACKGROUND OF THE INVENTION

1. Field of the Invention

This invention relates to an electronic tachometer, and more particularly to an electronic tachometer that includes a differentiating and timing means and signal processing circuitry that combines a differentiated discontinuous position signal and a continuous acceleration signal to form a continuous velocity signal.

2. Description of the Prior Art

In the prior art an electronic tachometer is available which produces a continuous velocity output signal from a continuous velocity signal having unintelligible high frequency information and a continuous acceleration signal. Such a tachometer can be derived from the teachings of U.S. Pat. No. 3,351,829 and is illustrated in FIG. 1 of the drawings. In this tachometer the continuous velocity signal applied to line 10 is applied to a first input of a low pass filter signal processing means 15 and the continuous acceleration signal is applied simultaneously to a second input 12. The signal processing means comprises input resistors 16 and 17 connected to an operational amplifier 18. A feedback network comprising a parallel combination of capacitor 19 and resistor 20 provides a low pass filter. Using purely integration techniques the continuous acceleration signal does not provide a continuous velocity signal of the same phase since in servo systems electrical current from a servo motor leads the actual acceleration due to the mechanical damping of the system. This tachometer is inoperable when the input velocity signal is discontinuous.

In another prior art electronic tachometer a continuous acceleration signal and a discontinuous position signal are used to develop a continuous velocity output signal. The acceleration signal is integrated by a capacitor circuit. As in all integrating systems a DC drift is accumulated on the integrating capacitor. To correct this accumulation and to compensate for the voltage buildup on the capacitor the discontinuous position signal is differentiated and then selected portions are applied through a sample and hold circuit to initialize the capacitor. However, this introduces significant discontinuities in the output velocity signal. Moreover, the velocity output of this tachometer is subject to phase error because it does not account for the mechanical damping in the system.

In order to overcome the above-noted defects this invention provides a novel electronic tachometer assembly that provides a true velocity output signal from a discontinuous position signal and a continuous acceleration signal.

Another object is to provide an electronic tachometer comprising differentiating and timing means for receiving the discontinuous position signal, for generating timing signals from the discontinuous position signal, and for generating a differentiated discontinuous position signal from the discontinuous position signal and the generated timing signal, where the differentiated discontinuous position signal is an interrupted velocity signal, and signal processing circuitry for receiving the differentiated discontinuous position signal and the timing signal from the differentiating and timing means and for receiving the continuous acceleration signal, the timing signals changing the transfer function of the signal processing circuitry at specific times with relationship to the discontinuous position signal for combining the differentiated discontinuous position signal and the continuous acceleration signal to form the continuous velocity signal.

In accordance with the preceding object, it is still a further object to provide an electronic tachometer wherein the signal processing circuitry includes a low pass filter with a switchable time constant.

The foregoing and other objects, features and advantages of the invention will be apparent from the following more particular description of a preferred embodiment of the invention as illustrated in the accompanying drawings.

DESCRIPTION OF THE PREFERRED EMBODIMENT

Figure 2:
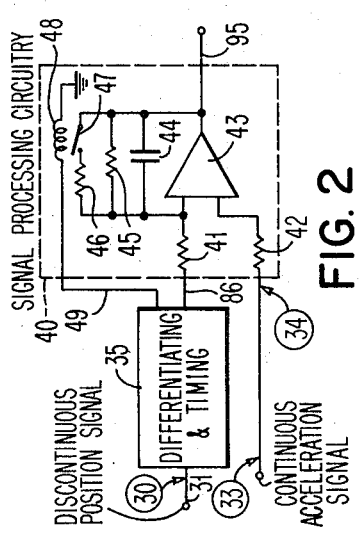
FIG. 2 is a schematic diagram of a preferred embodiment of the tachometer of this invention.
Figure 4:
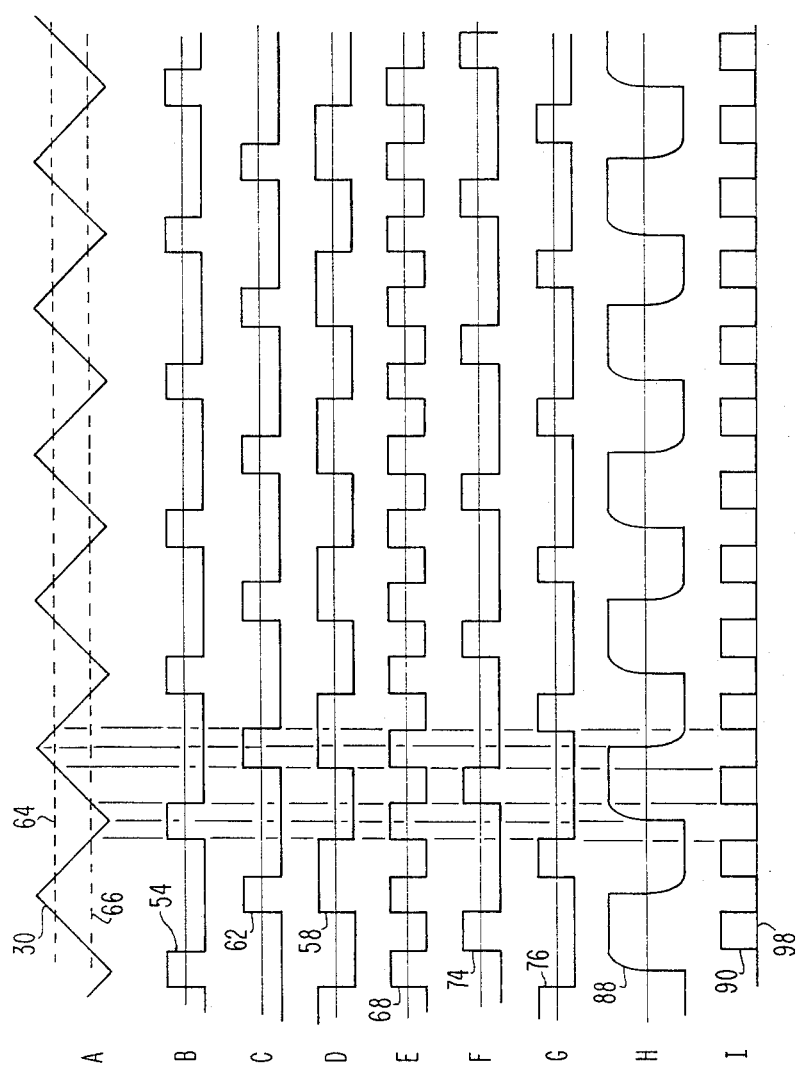
FIG. 4 is a plot of several wave forms representative of the voltage signals at various points within the electronic tachometer circuitry.

Referring to the drawings and more particularly to FIG. 2 thereof, the preferred embodiment of this electronic tachometer is illustrated. As shown therein, the tachometer comprises a differentiating and timing means, generally designated by the numeral 35, that is operably connected to signal processing means, generally designated by the numeral 40. The wave forms representative of voltage signals as a function of time at several points in the circuit are illustrated in FIG. 4. A discontinuous position signal 30 shown by wave form A in FIG. 4 is applied on line 31 to the differentiating and timing means 35. The discontinuous position signal 30 is a triangular wave form with respect to time, having a constant amplitude and discontinuities at its peaks and troughs. The period of the wave form may vary. To realize intellible results at the points of discontinuity the novel differentiating and timing network selectively eliminates regions of the signal proximate the discontinuity and generates an interrupted velocity signal 90 as shown by wave form I in FIG. 4 to the signal processing circuitry 40 on a first output line 86. Also, on a second output line 49, circuitry 40 provides a timing signal, illustrated prior to being inverted by wave form E, to control the time constant of a low pass filter included within the signal processing means. An approximate acceleration signal 33 is continuously applied to another input 34 of the signal processing means 40. This approximate acceleration signal differs from the true acceleration of the system due to mechanical damping and losses.

In a preferred embodiment, discontinuous signal 30 is received from a closed loop track following servo system transducer as it radially accesses successive tracks of equal width on a rotating disk in a disk drive, the zero crossings indicating the center of each of the respective tracks. This servo position error signal generally includes wideband noise. The continuous acceleration signal is produced by current from a servo motor utilized in the closed loop servo system. During accessing the current exhibits a constant amplitude rectangular wave form (not shown) of opposite polarities that may be separated by a zero level. The length of the zero level is a function of the seek time required in accessing the desired track. When the period of the position signal is constant the current is constant and approximately zero.

If the output of a physical system is related to the input by a linear relation that can be reduced to a mathematical model that is a linear differential equation, the input-output relationships can be expressed in terms of the Laplace transform of the differential equations. Such a functional relation is termed a transfer function.

The signal processing circuitry 40 includes a low pass filter having a switchable time constant. In Laplace transform notation the low pass filter is designated $\tau/s\tau + 1$, where $\tau$ is the filter time constant and can have any value. Interconnecting the input and the output of the filter is a negative feedback loop with the transform $k_v/M$, where $k_v$ is the viscous damping constant attributable to windage and other losses in the motor which produces the acceleration signal, and M is the moving mass of the system and is constant for each particular system.

In view of the fact that the interrupted continuous velocity input signal 90 to the low pass filter is derived from a position signal with a periodic discontinuity, $\tau$ in the above equations is made periodically varying such that when the points of discontinuity occur, $\tau$ approaches $\infty$. Thus, the discontinuities are removed from the velocity output signal developed by the electronic tachometer.

The signal processing circuitry implementing these Laplace transforms includes a high gain operational amplifier 43 having a first input resistor 41 through which the interrupted velocity signal 90 is applied and a second input resistor 42 through which the continuous acceleration signal is applied. A negative feedback network is disposed between the velocity receiving input conductor and the output conductor 95 of the amplifier. The feedback network comprises three parallel branches, the first including a capacitor 44, the second comprising a resistor 45 and the third branch comprising resistor 46 in series with a switch 47. Consequently, the transfer function of the signal processing circuitry has two values depending upon the state of switch 47.

The time constant of this filter is the product of the capacitance times the effective resistance of the feedback network. Accordingly, with switch 47 open, the time constant, $\tau$, is the product of capacitor 44 and resistor 45. With switch 47 closed the effective resistance is the parallel combination of resistors 45 and 46. In this embodiment, resistor 45 is much greater in value than resistor 46. Consequently, the time constant of the network when the switch is closed, $\tau_1$, is much less than $\tau$, the time constant when the switch is open. $\tau$ for the purposes of this explanation is assumed to approach $\infty$ and $\tau_1$ is large enough to adequately remove high frequency noise from the interrupted velocity signal. In operation, periodically opening and closing switch 47 is equivalent to changing the time constant from $\tau_1$ to $\infty$. More particularly, switch 47 is closed whenever coil 48 is energized. This occurs when the interrupted velocity signal 90 has a non-zero value as will be later described. By the selective opening and closing of switch 47 and switches 78, 81 and 83 in the differentiating and timing means 35, the effect of discontinuities are removed from the continuous velocity output.

In the preferred embodiment resistor 41 equals $\tau_1/\beta$, resistor 42 equals $M/\beta k_f$, capacitor 44 equals $\beta$; resistor 45 equals $M/\beta k_v$; and resistor 46 equals resistor 41 in value, where $k_v$ is the viscous damping constant, $k_f$ is the force constant of an electromechanical actuator associated with this tachometer, $\beta$ is an impedance scaling factor interrelating the components, and M is the moving mass of the system as previously defined.

Figure 3:
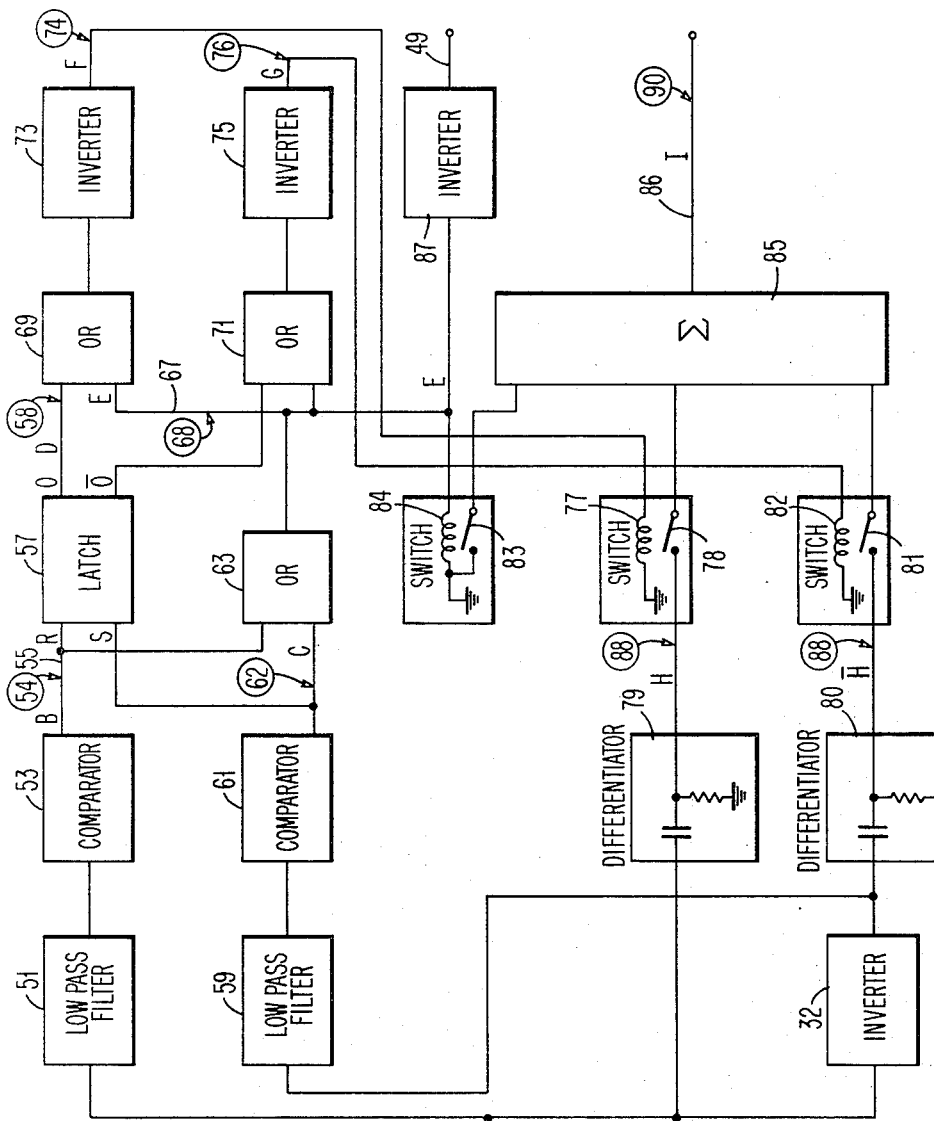
FIG. 3 is a schematic diagram of a circuit for developing an interrupted velocity signal from a discontinuous position signal employed in the preferred embodiment of this invention.
Figure 1:
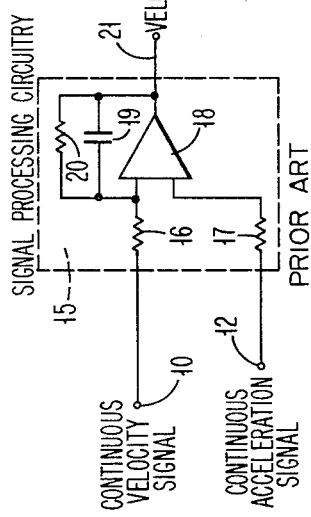
FIG. 1 is a schematic diagram of a prior art electronic tachometer.

Referring now to FIG. 3 the particular differentiating and timing means 35 is shown which provides both a differentiated discontinuous position signal to the signal processing circuitry and timing signals for application within the differentiating means and to the signal processing circuitry. The discontinuous position signal 30 is applied directly to a differentiating circuit 79 to produce signal 88, illustrated by wave form H, and to a differentiator 80 after phase inversion through inverter 32 to produce a signal having a wave form 180° out of phase with signal 88 and designated H. Thus, two differentiated discontinuous position signals are formed. Signal 30, directly and in inverted form, is also applied to the time generating circuitry illustrated in the top portion of FIG. 3 for use in generating specific timing signals. The low pass filters 51 and 59 respectively eliminate noise. Comparator 53 clips the filtered signal so as to produce a signal 54 as illustrated by wave form B and comparator 61 similarly develops a signal 62 represented as wave form C. In the preferred embodiment the triangularly shaped discontinuous position signal 30 has a peak to peak amplitude of 10 volts and the reference level of comparators 53 and 61 is $-2.5$ volts. Thus the comparators provide clipping at 50 percent of the peak level as illustrated by lines 64 and 66 through wave form A. Accordingly, as illustrated by wave forms B and C the output of the comparators are up whenever the respective input signals are more negative than the $-2.5$ volt reference signal.

The respective comparator output signals 54 and 62 are applied to the reset and set inputs respectively of a latch 57 and the inputs of OR gate 63. The output 67 from OR gate 63 is simultaneously applied to OR gate 69, and OR gate 71, and to coil 84, and through inverter 87 on conductor 49, to coil 48. The signal 68, illustrated by wave form E on line 67, thus provides a first timing signal for use in forming the composite differentiated discontinuous position signal 90 and for controlling the change in time constant of the low pass filter. Each of coils 77, 82, 84 and 48 is the energizing means of a normally open relay contact, designated in this specification as a switch.

When signal 68 is up ground potential is applied through switch 83 to analog summer 85 and when signal 68 is not up resistor 46 is switched into the feedback loop in the signal processing means 40. A first output of latch 57 illustrated as the inverse of wave form D is connected to the input of OR gate 71 and through inverter 75 to relay coil 82 which energizes switch 81. Closing switch 81 applies the inverted differentiated discontinuous position signal 88 to summer 85. Similarly, at a second output of latch 57, signal 58 illustrated as wave form D is applied to OR gate 69, and inverted by inverter 73 to provide a switch energizing signal 74 illustrated as wave form F. This wave form is applied to coil 77 for selectively closing switch 78. Closing switch 78 couples the differentiated discontinuous position signal 88 to summer 85.

In operation signal 74 is up whenever the input signal 30 is travelling positively from the low comparator reference 66 to the high comparator reference 64. Similarly signal 76 is up whenever the discontinuous input signal is travelling negatively between the reference comparator levels. Signal 68 is up when neither signal 74 or 76 is up. Accordingly, the timing signals 68, 74 and 76 applied to the switches 83, 78 and 81, respectively, are mutually exclusive. In view of the above discussion it is shown that only the flat peak portion of the differentiated discontinuous position signal 88 is applied through switch 78 to summer 85 and the flat portion of the similar but inverted signal through differentiation network 80 is applied through switch 81 to summer 85. In between the application of these signals the voltage level is zero since switch 83 is then closed. The resultant composite of the two time-spaed differentiated signals separated by a ground reference potential 98 is the interrupted velocity signal 90, illustrated as wave form I. Signal 90 includes segments of the differentiated discontinuous position signal 88 and is the signal applied on the output line 86 of the differentiating and timing means to the signal processing network as illustrated in FIG. 3.

As previously discussed, timing signal 68 which is applied to selectively control switch 83 is also applied through an inverter 87 to the coil 48 in the signal processing unit network. Accordingly, whenever the interrupted velocity signal has a zero potential, coil 48 is not energized and thus the feedback circuit comprises only capacitor 44 and resistor 45. However, whenever the interrupted velocity signal has an up value, switch 47 is closed and resistance 46 is included in the effective resistance of the feedback network. In this condition the time constant of the feedback network is effectively decreased. Consequently, the transfer function is also changed since as shown earlier in this specification the transfer function is dependent upon time constant $\tau$.

In operation the approximate acceleration signal appears at the input of the operational amplifier 43 at all times. However, due to the mechanical friction and windage losses of the motor, the phase angle of this electrical signal lags the phase angle of the true acceleration of the system. Merely integrating the signal will not provide the necessary phase relationship between the actual acceleration input signal and the continuous velocity output signal. In addition, a capacitive integrator has DC drift. The interrupted velocity signal 90 contains valid DC and low frequency velocity information but is contaminated by high frequency noise from the mechanical system as well as the switching transients. The high frequency noise could be adequately attenuated by a low pass filter but such a filter by itself introduces unacceptable phase shift. Applying the acceleration signal at all times prevents the phase shift in the low pass filter from appearing in the veloctiy output signal. The signal processing network 40 thus combines these two signals because of its changeable transfer function such that each contributes to the resultant velocity output signal so that it is in proper phase relationship with the discontinuous position input signal and eliminates intefering high frequency noise.

It should be noted that since the time constant in the low pass filter is made to change abruptly, piecewise linear system analysis techniques can be applied. It should also be noted that 90 is an interrupted continuous velocity signal rather than a sampled data velocity signal. A sampled data velocity signal cannot produce a continuous velocity output signal with the desired phase relationship.

Alternatively, an absolute value circuit could replace latch 57, gates 69 and 71, inverters 73 and 75, and switches 78 and 81 to provide the interrupted continuous velocity signal.

Accordingly, an electronic tachometer having a low pass filter with a switchable time constant has been described for producing a continuous velocity output signal from a discontinuous position signal. This sytem because of its precise accuracy is presently embodied in disk drive environments wherein the initial position signal is sensed by a magnetic transducer radially traversing a plurality of adjacent tracks. However, this system has general application in many closed looped control systems and is equally applicable when optical sensing is used.

While there has been described what are, at present, considered the preferred embodiments of the invention, it will be understood that various modifications may be made therein, and it is intended to cover in the appended claims all such modifications as fall within the true spirit and scope of the invention.

What is claimed is:

1. An electronic tachometer for generating a continuous velocity output signal from the combination of a discontinuous position signal and a continuous acceleration signal, comprising:

a differentiating and timing means for receiving said discontinuous position signal, for generating a plurality of timing signals from said discontinuous position signal, and for generating a differentiated discontinuous position signal from said discontinuus position signal in response to said generated timing signals, where said differentiated discontinuous position signal is an interrupted velocity signal; and signal processing circuitry for receiving said differentiated discontinuous position signal and for receiving at least one of said timing signals from said differentiating and timing means, and for receiving said continuous acceleration signal, said timing signals changing the transfer function of said signal processing circuitry at specific times with relationship to said discontinuous position signal for combining said differentiated discontinuous position signal and said continuous acceleration signal to form said continuous velocity signal.

2. The electronic tachometer set forth in claim 1, wherein said signal processing circuitry includes a low pass filter with a switchable time constant, said timing signals operating to switch said time constant of said low pass filter, thereby changing the transfer function of said signal processing circuitry.

3. The electronic tachometer set forth in claim 2, wherein said low pass filter comprises a switch in series with a resistor, said timing signals actuating said switch, thereby changing the effective resistance of said low pass filter.

4. The electronic tachometer set forth in claim 3, said low pass filter having a transfer function $\tau/s\tau + 1$, where $\tau$ has a first value when said switch is open and a second value when said switch is closed, said value being deendent upon said resistor.

5. The electronic tachometer set forth in claim 3, said interrupted velocity signal comprising a plurality of time-separated segments taken from the continuous portions of said differentiated discontinuous position signal; and said timing signal opening said switch when each said time-separated segment is received by said signal processing circuitry.

6. The electronic tachometer set forth in claim 1, wherein said signal processing means comprises a first input resistor for receiving said differentiated discontinuous position signal, a second input resistor for receiving said continuous acceleration signal, an operational amplifier operably connected to said first and said second resistors, a feedback circuit interconnecting the output and the input of said operational amplifier, said feedback circuit having a first time constant and further comprising, switchable means for changing said time constant of said feedback circuit, said timing signal operably connected to said switchable means for effecting said change in said time constant, said amplifier combining said differentiated discontinuous position signal and said continuous acceleration signal to form said continuous velocity signal.

7. The electronic tachometer set forth in claim 6, where the values of said first resistor $= \tau_1/\beta$, said second resistor $= M/\beta k_f$, said first time constant $= M/k_v$, and said switchable means comprises resistive means having a resistance equal to said first resistor.

8. The electronic tachometer set forth in claim 7, wherein said feedback circuit comprises a capacitor and a third resistor in parallel for forming said first time constant, said third resistor being much larger than said resistive means.

9. The electronic tachometer set forth in claim 1, wherein said differentiating and timing means comprises means for differentiating said discontinuous position signal; and comparator means operably connected to said discontinuous position signal for generating specific ones said timing signals.

10. The electronic tachometer set forth in claim 9, and further comprising switch means for connecting the output of said differentiating means to said signal processing circuitry; and latch means for receiving timing signals from said comparator means and for deriving the timing signals for application to said switch means.

* * * * *